Oct. 30, 1928.
C. E. WISE
1,689,657
LOCKING VALVE FOR GAS BURNERS
Filed Aug. 1, 1927
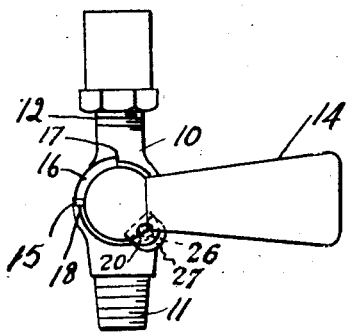
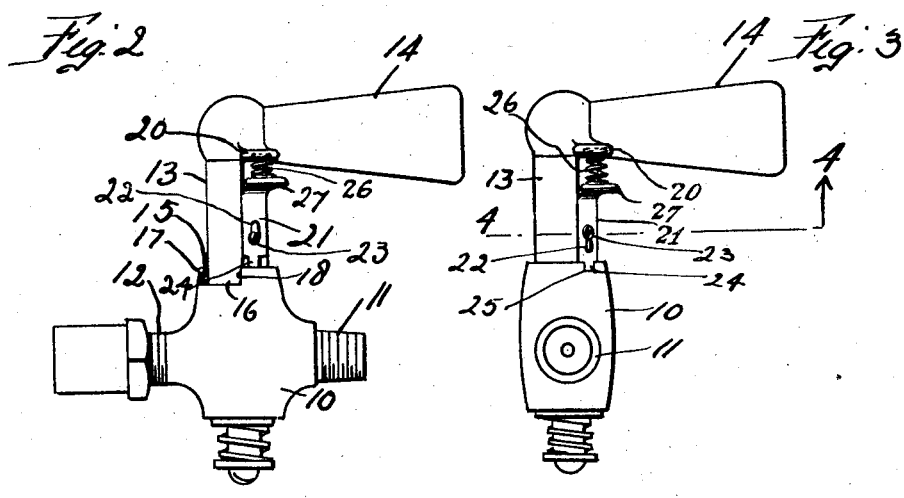
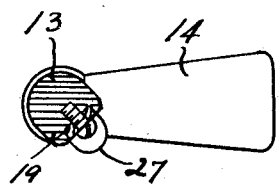
INVENTOR
Charles E. Wise
By W. W. Williamson Atty.

Patented Oct. 30, 1928.

1,689,657

UNITED STATES PATENT OFFICE.

CHARLES E. WISE, OF PHILADELPHIA, PENNSYLVANIA.

LOCKING VALVE FOR GAS BURNERS.

Application filed August 1, 1927. Serial No. 209,772.

My invention relates to new and useful improvements in locking valves for gas burners, and has for its primary object to provide an exceedingly simple and effective device of this character whereby the valve may be held in a closed position to prevent accidental opening thereof as when struck by a person's hand or some object carried by a person when passing a gas burning appliance equipped with such valves.

Another object of my invention is to provide a valve for gas burners wherein the handle is held in a closed position by a spring actuated sliding catch on a guideway of the stem.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which:

Fig. 1 is a plan view of a locking valve for gas burners constructed in accordance with my invention, the parts being shown in the locked position.

Fig. 2 is a side elevation thereof with the parts in an open position.

Fig. 3 is a front elevation with the parts in a position shown in Fig. 1.

Fig. 4 is a section on the line 4—4 of Fig. 3.

In carrying out my invention as herein embodied, 10 represents the usual body of a valve such as generally used in connection with gas burning appliances provided with an inlet 11 at this outer end for connection with a pipe or manifold and an outlet 12 at this inner end and having co-operation with the usual burner.

In the valve body is rotatably mounted the usual valve plug (not shown) which is operated through the medium of the stem 13 to which is attached a handle 14 in the usual way. The stem carries a stop pin 15 which travels in a slot 16 in the upper edge of the body, said slot forming two stop shoulders 17 and 18 with which the pin 15 coacts to limit the movements of the valve stem.

In the stem is formed a longitudinal guideway 19 at the upper end of which is a projection 20 and in said guideway is slidably mounted a latch 21 having a longitudinal slot 22 therein through which passes a suitable fastening device 23, such as a screw threaded into the stem within the guideway. At the lower end of the latch is a reduced nose 24 for registration with the keeper notch 25 formed in the upper edge of the valve body when the value is in a closed position and adapted to rest upon said upper edge of the valve body when in any other position as when in a partial or full-open position.

The latch is normally forced toward the valve body by a spring 26 engaging the upper end of the latch and the lug 20, while said latch may be moved against the action of the spring by means of a finger hold 27 formed with and projecting outwardly from the upper end of said latch.

When the valve is in a closed position as shown in Figs. 1, 3, and it is desirable to open the same, it is only necessary to place the thumb under the finger hold 27 and lift it to withdraw the nose of the latch from the keeper notch and while the latch is withdrawn, the valve handle may be operated. To close the valve it is unnecessary to touch the latch as it will ride along the upper edge of the valve body until in registration with the keeper notch 25 when the spring will cause said latch to enter the keeper notch and thus hold the valve against accidentally being opened.

Of course I do not wish to be limited to the exact details of construction as herein shown, as these may be varied within the limits of the appended claim without departing from the spirit of my invention.

Having thus fully described my invention, what I claim as new and useful is:—

A locking valve for gas burners comprising a valve body having a slot and notch in its upper edge, a valve stem, a pin projecting from the stem into the slot, a guideway longitudinally of the stem, a lug at the outer end of said guideway, a latch slidably mounted in the guideway and provided with a nose for registration with the notch when the valve stem is in a closed position and riding on the edge of the valve body when in other positions, a finger hold at the outer end of the latch, a spring between the lug and finger hold to normally force the latch inward, and a handle on the stem to rotate the same when the latch is withdrawn from the notch against the action of the spring.

In testimony whereof, I have hereunto affixed my signature.

CHARLES E. WISE.